United States Patent
Niva

(10) Patent No.: US 8,936,319 B2
(45) Date of Patent: Jan. 20, 2015

(54) METHOD AND ARRANGEMENT AT TRUCKS FOR TIPPING A LOADING BIN

(75) Inventor: Karl-Erik Niva, Kiruna (SE)

(73) Assignee: Atlas Copco Rock Drills AB, Orebro (SE)

( * ) Notice: Subject to any disclaimer, the term of this patent is extended or adjusted under 35 U.S.C. 154(b) by 0 days.

(21) Appl. No.: 13/261,369

(22) PCT Filed: Feb. 17, 2011

(86) PCT No.: PCT/SE2011/050178
§ 371 (c)(1),
(2), (4) Date: Jul. 16, 2012

(87) PCT Pub. No.: WO2011/102797
PCT Pub. Date: Aug. 25, 2011

(65) Prior Publication Data
US 2012/0301264 A1   Nov. 29, 2012

(30) Foreign Application Priority Data

Feb. 19, 2010 (SE) ........................................ 1050166

(51) Int. Cl.
*B60P 1/04* (2006.01)
*F16C 11/04* (2006.01)
*B60P 1/28* (2006.01)

(52) U.S. Cl.
CPC .................................... *B60P 1/283* (2013.01)
USPC .......................... 298/17 R; 298/17.5; 414/812

(58) Field of Classification Search
USPC ......... 298/17.5–17.7, 19 R, 1 R, 11, 22 P, 18; 414/495; 296/183.2; 180/24.07, 348
See application file for complete search history.

(56) References Cited

U.S. PATENT DOCUMENTS

| 1,705,968 | A | | 3/1929 | Eisenhut | |
| 2,674,489 | A | * | 4/1954 | Maxon, Jr. | 298/17 R |
| 3,552,798 | A | | 1/1971 | Cole et al. | |
| 3,610,690 | A | | 10/1971 | Mengel | |
| 4,049,071 | A | * | 9/1977 | Stedman | 180/24.05 |
| 4,071,277 | A | * | 1/1978 | Stedman | 298/22 P |
| 4,616,879 | A | | 10/1986 | Booher | |
| 5,163,700 | A | * | 11/1992 | Loeber | 280/683 |
| 5,476,285 | A | * | 12/1995 | Dickerson | 280/781 |
| 6,086,076 | A | | 7/2000 | Prem et al. | |
| 6,669,303 | B2 | * | 12/2003 | Dodd | 298/17 B |
| D596,076 | S | * | 7/2009 | Kelley et al. | D12/15 |

FOREIGN PATENT DOCUMENTS

| JP | 57000921 A | 1/1982 |
| JP | 62034828 A | 2/1987 |
| JP | 1168534 A | 7/1989 |

* cited by examiner

*Primary Examiner* — Glenn Dayoan
*Assistant Examiner* — Sunsurraye Westbrook
(74) *Attorney, Agent, or Firm* — Mark P. Stone

(57) ABSTRACT

A truck for heavy transport that comprises a front part coupled with a rear part. The rear part comprises a load arrangement including a load frame arranged to support a loading bin. The loading bin is arranged such that it can be pivoted at the rear end of the load frame, whereby the load arrangement or load frame comprises a pivot arrangement arranged to displace the point of attack of the weight of the load during a lifting operation of the loading bed.

20 Claims, 4 Drawing Sheets

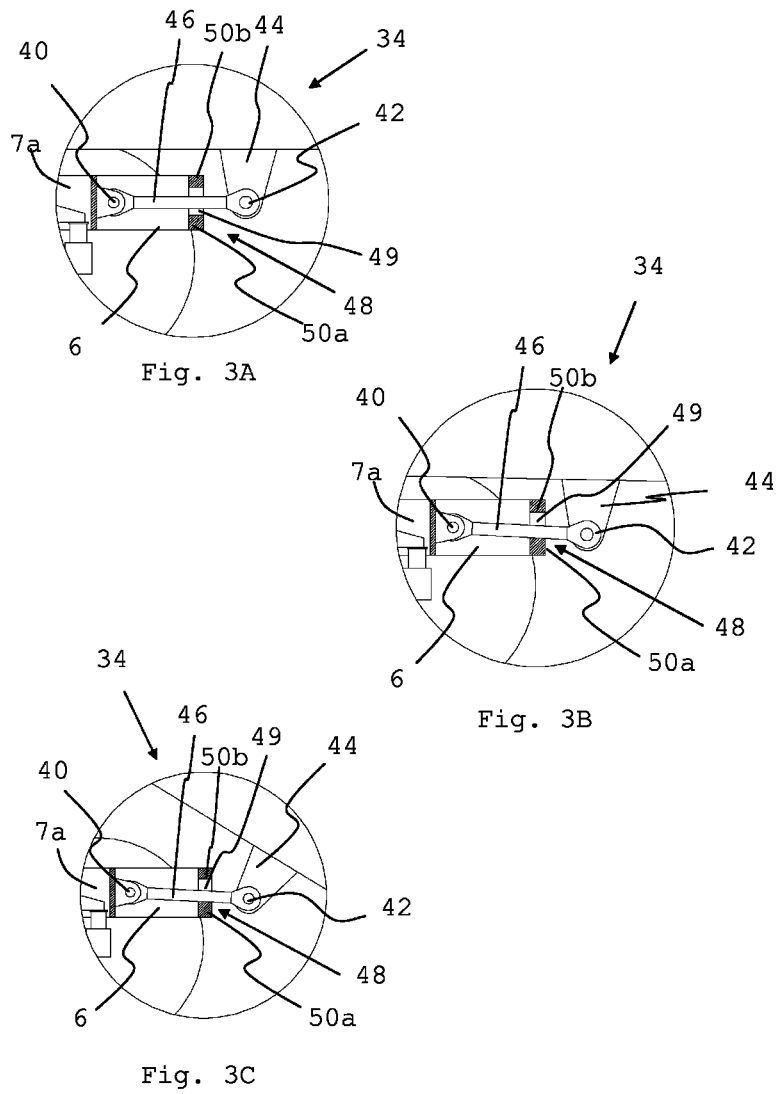

METHOD AND ARRANGEMENT AT TRUCKS FOR TIPPING A LOADING BIN

TECHNICAL AREA

The present invention concerns a method for tipping a loading bin arranged at a truck and a pivot arrangement for the execution of the method according to the preamble to the independent claims. The invention concerns also a truck comprising such an arrangement.

THE PRIOR ART

Vehicles for heavy loads normally have a load carrier that includes a loading bin, such as a loading bed, that can be tipped backwards around a pivot arrangement and that is supported by a load frame. For the dimensioning of the load carrier and, in particular, the load frame for such vehicles, not only the static maximal load must be taken into account, but also the dynamic factors to which the machine will be exposed while working with the load carrier. In addition, the dimensioning of the load frame must include also safety aspects. What is crucial to the weight, dimension and cost of the load frame is the manner in which the weight of the load is distributed over the load frame. The term "forwards" in the following text will be used to denote the direction from the rear of the vehicle towards the front, i.e. the direction of travel of the vehicle when in use. In the same manner, the term "backwards" will be used to denote the opposite direction from the front of the vehicle towards the rear, i.e. the direction of travel when the vehicle reverses. The act of tipping the loading bin will be denoted by "lifting operation of the loading bed".

The support of the loading bin by one or several shock-absorbing pads (buffers) arranged at the front of the load frame and that are mechanically suspended in the direction of pivoting (the direction of tipping) is known. In this manner the load is supported relative to the load frame at the front edge of the loading bin and backwards, at the pivot. The load-bearing wheels are mounted at the frame between the front and rear points of attack of the load. This means that the load frame must be dimensioned for large bending loads, which requires large and heavy load frames in order to ensure that the load frame is sufficiently resistant to bending to withstand the bending stresses that arise. This increases the deadweight of the load frame, and increases costs.

In order to achieve lower bending stresses in the load frame, the distribution of the load onto several shock-absorbing buffers arranged at the load frame in the region of the frame and the loading bin, and thus achieving a broad distribution of load along the frame, is therefore known. The problem is to achieve an optimal distribution of the load along the frame whereby the buffers must be correctly adjusted, which is difficult to achieve. The load frame is, instead, overdimensioned. Also deformations of the loading bin that arise through its use make difficult an optimal distribution of load where several buffers are used, and thus the resulting distribution of the load is changed. If, in addition, one or several of the buffers is wrongly adjusted or has been removed, the weight of the load is distributed unevenly and in an uncontrolled manner across the other buffers. In addition to the fact that the load frame is overdimensioned, monitoring and continuous adjustment of the buffers is required in order to avoid the effect of increasing bending stress, and this results in extra maintenance costs.

There is thus a need within the industry to achieve an improved load carrier.

DESCRIPTION OF THE INVENTION

The aim of the invention is to achieve an arrangement and a method by which the disadvantages of the prior art technology are removed, or at least reduced.

According to a first aspect of the invention, this is achieved through a pivot arrangement of the type described in the introduction through characterising distinctive features of the independent claim. Such a pivot arrangement is adapted to be arranged at a load arrangement for trucks including a load frame arranged to support load in a loading bin that is arranged such that it can be rotated through the pivot arrangement, whereby the pivot arrangement is arranged to displace the resulting point of attack of the loading bin during a lifting operation of the loading bed. The pivot arrangement is arranged at the rear end of the load frame. By selecting the point of attack for the loading bin during transport to be central over the load-bearing wheels, it is possible to reduce bending stress in the load frame caused by large bending and dynamic loads, and the load frame can in this way be made slimmer and lighter.

According to a further embodiment, the pivot arrangement comprises a first pivot joint, fixed at the frame in a manner that allows it to rotate, a second pivot joint, fixed at the loading bin in a manner that allows it to rotate, whereby the first and the second pivot joints are united with each other by an arm in a manner that allows rotation. It is in this way possible to displace the centre of pivoting of the loading bin during tipping, and it is at the same time possible to change the distribution of load during transport such that the greater part of the load is transferred centrally over the beam for the rear axle of the truck. The pivot arrangement is in this way arranged to rotate the loading bin during a lifting operation of the loading bed and in this way displace the point of attack of the loading bin. The first of the two pivot joints of the pivot arrangement is jointed with the frame, while the second is jointed with the loading bed. Thus the pivot arrangement has two fixed points of jointing. During a lifting operation of the loading bed, the weight of the load is displaced from the first pivot joint to the second pivot joint through the arm being rotated. Through the second pivot joint having a fixed point of support in the load frame on which the load rests during transport and through it being located at a considerable distance from the first pivot joint, the bending stresses during transport are reduced.

In one preferred embodiment the pivot arrangement comprises also stop means, arranged to limit the extent of motion of the arm. It is therewith possible to control the motion of the arm such that it stops the motion of the pivot joint at a position at which the centre of pivoting is displaced from the first pivot joint to the second pivot joint.

According to a second aspect of the invention, this is achieved through a truck of the type described in the introduction through the characterising distinctive features of the independent claim. Such a truck for heavy transport may comprise a front part united with a rear part comprising a load arrangement that includes a load frame arranged to support a loading bin, whereby the loading bin is arranged at the rear end of the load frame such that it can be rotated, whereby the load frame comprises a pivot arrangement as has been described above, arranged to displace the resulting point of attack of the loading bin during a lifting operation of the loading bed. By displacing the resulting point of attack of the loading bin during a lifting operation of the loading bed and at the beginning of lift of the loading bed it is possible not only to allow the greatest part of the weight of the load to attack centrally over the rear axle beam during transport, but also that the point of attack of the loading bin during tipping, i.e. the centre of pivoting of the loading bin, is displaced to the rear end of the rear part of the load frame during tipping. Thus we need to consider nearly only the static load when dimensioning the load frame, and this leads to savings in weight and costs of the load frame. The solution gives levels of dimensioning bending stress that are considerably lower than those of the prior art technology. By arranging the loading bin such that it balances at a position above or in the vicinity of the rear of the rear axle beam during the transport phase, it is possible to reduce the dimensions of the load frame.

In one embodiment according to the invention the load frame comprises a rearwards rear axle supporting a bogie arrangement with two load-bearing wheel axles, provided with wheels, arranged under the rear part of the load frame. The advantage is that the loading bin is distributed among four wheels, which can therefore be made smaller in size and thus cheaper, and contribute to a lower overall height of the vehicle.

According to a third aspect of the invention, this is achieved through a method of the type described in the introduction through the characterising distinctive features of the independent claim. Advantageous embodiments are described in the non-independent claims. The method demonstrates the same advantages as have already been described in the claims relating to the arrangement.

DESCRIPTION OF DRAWINGS

The invention will be explained in detail below through description of embodiments with reference to the attached drawings, in which:

FIG. 3A shows a side view of the pivot arrangement at the truck in FIG. 1A in greater detail, FIG. 3B shows a side view of the pivot arrangement in FIG. 1B in greater detail, and FIG. 3C shows a side view of the pivot arrangement in FIG. 1C in greater detail.

DETAILED DESCRIPTION OF EMBODIMENTS

The following description relates to both the method and the pivot arrangement.

Figure 1A:
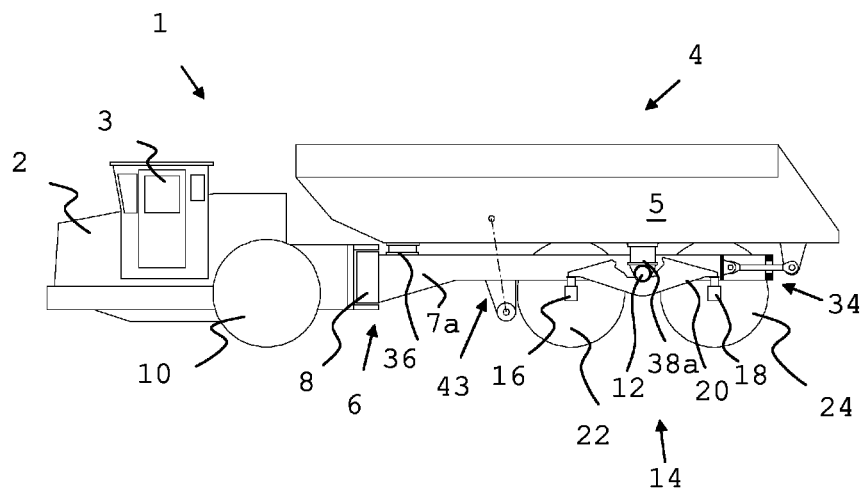
FIG. 1A shows a side view of a truck with a lowered loading bed with a pivot arrangement according to the invention.

FIG. 1A shows a side view of a truck 1 according to the invention. The vehicle 1 in this case is a articulated vehicle 1 and comprises a front part 2 with a driver cabin 3 and a rear part 4 with a load carrier. The load carrier comprises a loading bin 5, in this case a loading bed. The loading bin 5 makes contact with a load frame 6 which is arranged horizontally relative to the central axis A at the rear part 4, with two longitudinal beams, one of which is indicated with 7a.

The front part 2 is united to the rear part 4 through a control joint 8, in a manner that allows pivoting. The front part 2 comprises a forwards load-bearing wheel axle provided with one pair of wheels, one wheel of which is indicated with 10.

The rear part 4 comprises a rear axle 12 supporting a bogie arrangement 14 whereby the rear axle 12 is fixed attached between the longitudinal beams 7a, 7b. The bogie arrangement 14 supports two load-bearing wheel axles 16, 18, provided with wheels, that are mutually united through a pendulum suspension arrangement, comprising two pendulum arms on each side of the load frame 6, one pendulum arm of which is indicated with 20. The pendulum arms are fixed attached in a manner that allows pendulum oscillation at the rear axle 12 such that the resulting weight of the load attacks at a position above the rear axle 12 on the load frame 6 when the loading bed is in its lowered, transport, condition. The pendulum arm 20 distributes the load equally between the two wheel axles 16, 18 such that the weight of the load during the transport phase is supported by the bogie arrangement 14. The first rear axle 16, located closest to the forwards part of the rear part of the vehicle, supports a first pair of wheels, one wheel of which is indicated by 22, and the second wheel axle 18, located farthest back at the greatest distance from the front part of the vehicle, supports a second pair of wheels, one wheel of which is indicated by 24.

The loading bin 5 is arranged such that it can be pivoted through it being fixed attached at a pivot arrangement (a tipping arrangement) 34 arranged at the rear part of the load frame 6, farthest away from the front part 2 of the vehicle, arranged such that the load in the loading bin 5 can be tipped out of the same, behind the vehicle 1. The loading bin 5 is supported when it makes contact with the load frame 6, i.e. in the transport condition as shown in FIG. 1A, by a first pair of shock-absorbing buffers on each of the longitudinal beams 7a, 7b at the forward edge of the load frame 6, one buffer of which is indicated by 36, and by a shock-absorbing arrangement 38 comprising a second pair of shock-absorbing buffers on a beam between the longitudinal beams 7a, 7b at the back of the load frame 6, one buffer of which is indicated with 38a. The shock-absorbing buffers 36, 38a, 38b are arranged to be deformed under changes of pressure and subsequently to regain their original form when the pressure is reduced, whereby the loading bin 5 still retains a soft support during the initial phase of a lifting operation of the loading bed. The buffers may be of, for example, rubber or a polymer material. The second pair of buffers 38 at the back of the load frame 6 is arranged above the attachment point on the rear axle 12 of the relevant pendulum arm 20. In this way the point of attack of the total weight of the largest part of the load is located at a position centrally above the rear axle 12 of the bogie arrangement, during transport. Instead of a pair of buffers, one extended buffer may be used, or a spring arrangement comprising, for example, a metal spiral spring. The load arrangement further comprises two hydraulic cylinders arranged on each side of the beams 7a, 7b of the load frame as tipping cylinders, each one of which has an attachment 51 not only in front of the first back wheel 22 but also obliquely above in the loading bin 5 on the same side of the vehicle 1. During unloading of the load (a lifting operation of the loading bed), the position of the loading bin 5 is changed by the use of the hydraulic cylinders.

Due to the fact that the weight of the load is located centrally over the rear axle 12 of the bogie arrangement 14, it does not contribute any bending torque to the load frame 6 during transport when the loading bed is lowered down onto the load frame 6. The load that dimensions the load frame 6 will then be the load that is applied to the load frame 6 during transport the forward buffers, and through the tipping cylinders during a lifting operation of the loading bed, since the vehicle 1 stands still during lifting of the loading bed and thus an addition of dynamic factors is not necessary during the dimensioning.

The truck is intended in particular to carry heavy loads such as those arising during mining operations, road construction, etc., and it can be driven in a flexible manner, by virtue of its design, also through narrow passages in tunnels and other locations.

Figure 2:
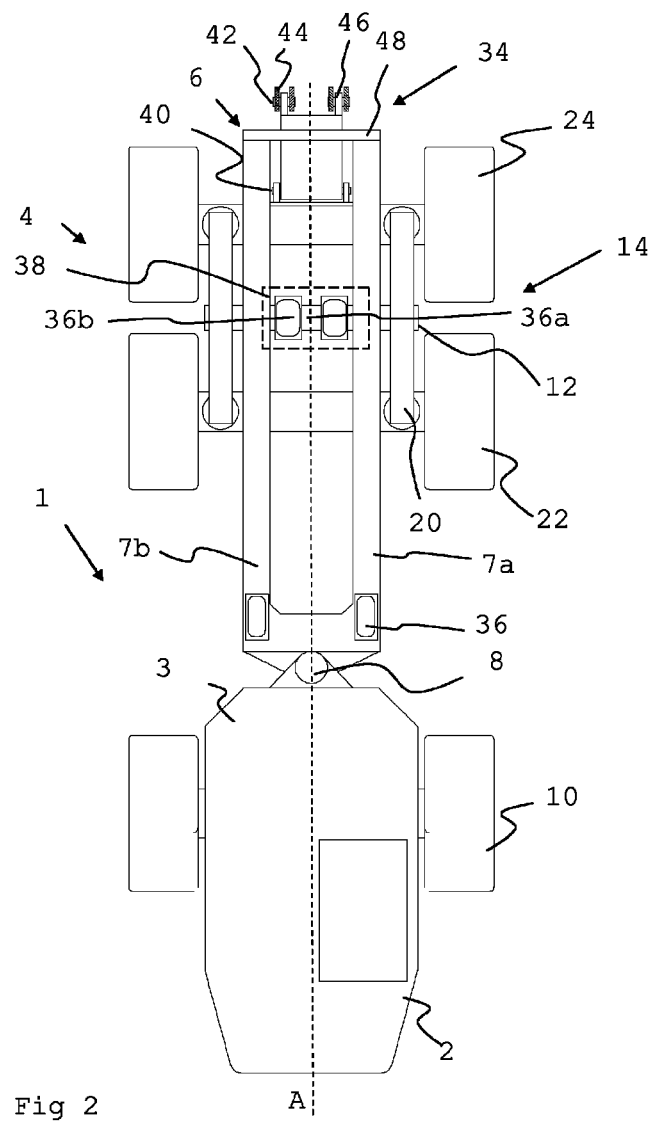
FIG. 2 shows a view from above of the truck in FIG. 1A without the loading bin.

FIG. 2 shows a view from above of the truck 1, without the loading bin, whereby the rear part 4 of the vehicle comprises a load frame 6. A shock-absorbing arrangement 38 is arranged on the load frame 6 at the back behind the rear axle 12 of the bogie arrangement 14. The shock-absorbing arrangement 38 comprises here two shock-absorbing buffers 38a, 38b. The pivot arrangement 34 is arranged farthest back on the load frame 6, farthest away from the front part 2 of the vehicle.

The pivot arrangement comprises a first pivot joint (pivot shaft) 40 perpendicular to the centre line A of the vehicle attached at the frame in a manner that allows rotation, and a second pivot joint (pivot shaft) 42, also this perpendicular to the centre line of the vehicle and attached at an attachment 44, which is also attached under the loading bin (not shown in the drawings), in a manner that allows rotation, the first and the second pivot joints are furthermore united with each other in a manner that allows rotation by an arm (a tipping beam) 46 that is attached at both the first 40 and the second 42 pivot joints in a manner that allows rotation, to form in this way a double pivot joint (tipping joint). The arm 46 in its resting position during transport has a longitudinal extension that is parallel to the centre line of the load arrangement when at rest. The pivot arrangement 34 comprises also stop means 48 (not shown in the drawings) arranged to limit the extent of motion of the arm. The attachment 44 is located behind the rear axle 12 of the bogie arrangement 14 during transport.

Figure 1B:
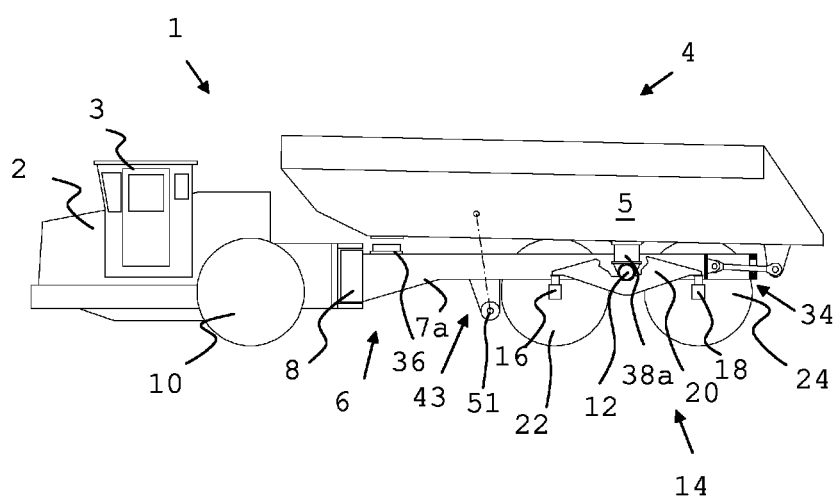
FIG. 1B shows a side view of the truck in FIG. 1A in the initial phase of a lifting operation of the loading bed.
Figure 1C:
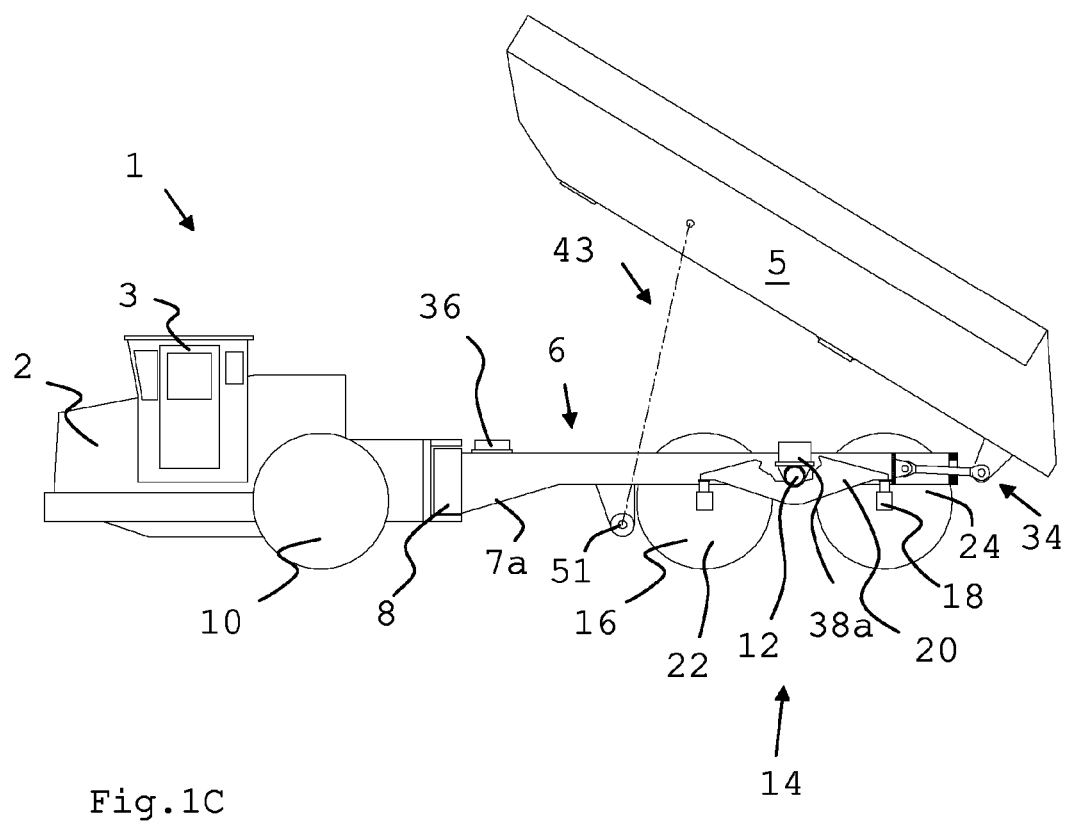
FIG. 1C shows a side view of the truck in FIG. 1A in the final phase of a lifting operation of the loading bed.

FIGS. 1A-1C show the method according to the invention as a sequence of a consecutive time points. FIGS. 3A-3C are side views of the pivot arrangement 34 corresponding respectively to the sequence in FIGS. 1A-1C.

FIG. 1A shows, as has been described above, a side view of the truck 1 during its transport phase, which is the same as the initial phase of a lifting operation of the loading bed, the first phase of the sequence. The load rests partly on the forward shock-absorbing buffers 36 and partly on the rear shock-absorbing buffers 38a, 38b such that the loading bin 5 essentially balances in a position over the rear axle beam 12 of the bogie arrangement 14. The pivot arrangement 34 is shown in FIG. 3A in more detail at the same instant. The pivot arrangement 34 comprising the first pivot joint 40, fixed at the frame in a manner that allows it to rotate, the second pivot joint fixed at the loading bin 5 by the attachment 44 in a manner that allows it to rotate, whereby the pivot joints are united to each other by the arm 46 in a manner that allows rotation. The first 40 and the second 42 pivot shafts of the pivot arrangement 34 are located in the same line in the horizontal direction, parallel to the extent of the beam 7a of the load frame: no weight is yet being placed onto any one of the pivot joints (the pivot shafts) 40, 42. The stop means 48, arranged to control and limit the extent of motion of the arm 46, is attached at farthest back at the frame, and it comprises a frame with an opening 49 through which the arm 46 passes. The opening 49 in this manner allows the arm 46 a freedom of movement between the greatest extent of the arm 46 downwards towards an impact beam 50a in the load frame during a lifting operation of the loading bed, and upwards towards a top beam 50b. Both the impact beam 50a and the top beam 50b pass transversely relative to the axis of symmetry A. The arm 46 furthermore has a construction that resists bending and prevents in this way the load from being turned in the sideways direction during a lifting operation of the loading bed. The arm 46 during the transport phase or initial phase has a longitudinal extent parallel to the centre line A of the load arrangement and is thus located in a central position in the opening 49 of the stop means 48.

FIG. 1B shows a side view of the truck 1 in FIG. 1A during the lifting phase of a lifting operation of the loading bed, the second phase in the sequence, where the load rests both on the rear shock-absorbing buffers 38a, 38b and on the first pivot joint 40. The pivot arrangement 34 is shown in FIG. 3B in more detail at the same instant.

A lifting operation of the loading bed is started by the tipping cylinders 43 on each side of the load being activated and starting to lift the loading bed. The point of attack of the loading bin (the loading weight) is displaced during this motion from a position above the rear wheels to the first pivot joint 40, and then onwards to the second pivot joint 42.

When the loading bin 5 starts to rotate backwards, it is lifted at its front edge such that it is no longer in contact with the foremost pair of buffers 36 and thus the loading bed instead is supported on the rear pair of buffers 38a, 38b and at the first pivot joint 40.

On further rotation upwards of the loading bin 5 it no longer makes contact with the rear pair of buffers 38a, 38b but supports the loading bed partly at the attachment 51 of the tipping cylinders and partly at the first pivot joint 40, which becomes in this manner the new point of attack of the load. The loading bin 5 in this way rotates around the first pivot joint 40.

Subsequently, when the tipping cylinders 43 lift the loading bin 5 further, the arm 46 rotates at the first pivot joint 40 down towards the contact beam 50a where the rotation motion is stopped by the arm reaching the contact beam 50a at the stop means 48.

FIG. 1C shows a side view of the truck in FIG. 1A during the tipping of the load, the final phase of a lifting operation of the loading bed, the third phase of the sequence; and FIG. 3C shows a detailed side view of the pivot arrangement 34 in FIG. 1C at the same moment. The point of attack of the load has now been displaced from the first pivot joint 40 to the second pivot joint 42. The point of attack of the load is here transferred to the second pivot joint 42, whereby the loading bin is supported at the second pivot joint 42 and at the tipping cylinders. The loading bin 5 now rotates solely around the second pivot joint 42. During the continued extension of the tipping cylinders up to the maximum tipping angle, the load on the load frame 6 arises in this manner not only through the cylinder attachments 51 but also through the contact beam 50a for the tipping beam.

The invention is not limited to the embodiments shown: one skilled in the arts can, naturally, modify it in a number of ways within the scope of the invention defined by the claims. Thus the vehicle 1 may also lack the bogie arrangement that is shown in FIGS. 1A-1C. Further, the front part 2 may comprise more than one forward wheel axle and the rear part may comprise more than two wheel axles. Furthermore, the front part of the truck may in various embodiments be provided with a forward load-bearing wheel axle with one or two pairs of wheels arranged under the front section of the load frame, and the rear part may in the same manner be provided with a bogie arrangement or solely with one pair of wheels. In addition, in a further embodiment, a vehicle with a rear axle with only one pair of wheels may be used. The front part may be fixed united with the rear part in further embodiments.

The invention claimed is:

1. A pivot arrangement for a load arrangement for transport, which load arrangement includes a load frame arranged to support a loading bin, wherein the pivot arrangement is arranged to rotate the loading bin, wherein the pivot arrangement is arranged to displace the point of attack of the loading bin during a lifting operation of the loading bin, wherein the pivot arrangement comprises a first pivot joint, fixed at the frame in a manner that allows it to rotate, a second pivot joint, fixed at the loading bin in a manner that allows it to rotate, wherein the first and second pivot joints are united with each other by an arm in a manner that allows rotation, wherein the weight of the load is displaced during a lifting operation of the loading bin from the first pivot joint to the second pivot joint through the arm being rotated.

2. The pivot arrangement according to claim 1, wherein the pivot arrangement comprises stop means arranged to limit the extent of motion of the arm.

3. A truck for transport, which truck comprises a front part coupled with a rear part comprising a load arrangement including a load frame arranged to support a loading bin, wherein the loading bin is arranged at the rear end of the load frame in a manner that allows rotation, wherein the load arrangement comprises a pivot arrangement according to claim 1.

4. The truck according to claim 3, wherein the loading bin is arranged to balance at a position above the rear axle during a transport phase.

5. The truck according to claim 4, wherein a first shock-absorbing arrangement arranged forwards at the load frame and a shock-absorbing arrangement arranged at the load frame behind the rear axle beam are arranged to support the loading bin.

6. The truck according to claim 5, wherein the shock-absorbing arrangement is at least one shock absorbing buffer formed from one of the following: rubber, polymer material.

7. The truck according to claim 5, wherein the shock-absorbing arrangement is a spring arrangement.

8. The truck according to claim 3, wherein the load frame comprises a rearwards rear axle arranged under the rear part of the load frame and supporting a bogie arrangement with two load-bearing wheel axles provided with wheels.

9. The truck according to claim 3, wherein the load frame comprises a rear axle arranged under the rear part of the load frame and supporting a load-bearing wheel axle provided with a pair of wheels.

10. A method for transport by a truck, which truck comprises a front part coupled with a rear part comprising a load arrangement including a load frame arranged to support a loading bin wherein the loading bin is arranged at the rear end of the load frame in a manner that allows rotation, wherein the method further comprises:

the displacement of the point of attack of the loading bin during a lifting operation of the loading bin, with a pivot arrangement that is comprised within the load frame, the pivot arrangement comprises a first pivot joint, fixed at the frame in a manner that allows it to rotate, a second pivot joint, fixed at the loading bin in a manner that allows it to rotate, wherein the first and the second pivot joints are united with each other by an arm in a manner that allows rotation, wherein the weight of the load is displaced during a lifting operation of the loading bin from the first pivot joint to the second pivot joint through the arm being rotated.

11. The method according to claim 10, wherein the loading bin is arranged to balance at a position above the rear axle beam during the transport phase.

12. The method according to claim 11, wherein there are arranged at the front of the load frame a first shock-absorbing arrangement and behind the rear axle beam a second shock-absorbing arrangement, wherein the shock-absorbing arrangements are arranged to support the loading bin during the transport phase.

13. The method according to claim 10, wherein the loading bin is supported during the transport phase by a bogie arrangement with two load-bearing wheel axles provided with wheels at a rear axle under the rear section of the load frame.

14. The method according to claim 10, wherein the loading bin is supported during the transport phase by a pair of wheels with a wheel axle arranged at a rear back axle under the rear section of the load frame.

15. A truck for transport, which truck comprises a front part coupled with a rear part comprising a load arrangement including a load frame arranged to support a loading bin, wherein the loading bin is arranged at the rear end of the load frame in a manner that allows rotation, wherein the load arrangement comprises a pivot arrangement according to claim 2.

16. The truck according to claim 4, wherein the load frame comprises a rearwards rear axle arranged under the rear part of the load frame and supporting a bogie arrangement with two load-bearing wheel axles provided with wheels.

17. The truck according to claim 5, wherein the load frame comprises a rearwards rear axle arranged under the rear part of the load frame and supporting a bogie arrangement with two load-bearing wheel axles provided with wheels.

18. The truck according to claim 4, wherein the load frame comprises a rear axle arranged under the rear part of the load frame and supporting a load-bearing wheel axle provided with a pair of wheels.

19. The method according to claim 11, wherein the loading bin is supported during the transport phase by a bogie arrangement with two load-bearing wheel axles provided with wheels at a rear axle under the rear section of the load frame.

20. The method according to claim 11, wherein the loading bin is supported during the transport phase by a pair of wheels with a wheel axle arranged at a rear back axle under the rear section of the load frame.

* * * * *